J. B. WRIGHT.
STARTING SYSTEM.
APPLICATION FILED APR. 29, 1918.
1,323,945. Patented Dec. 2, 1919.
2 SHEETS—SHEET 2.
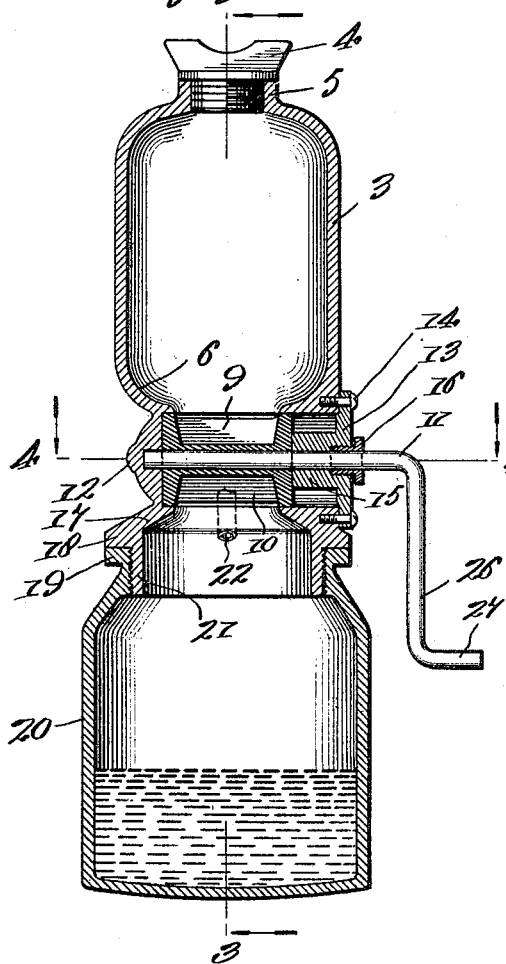
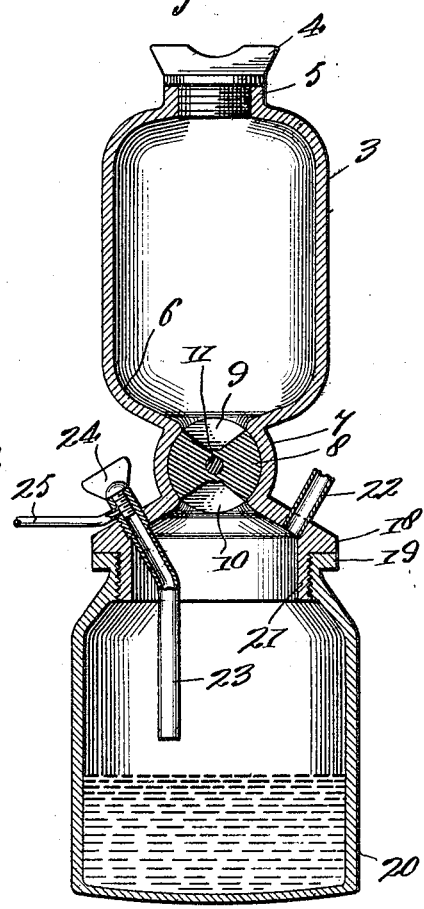
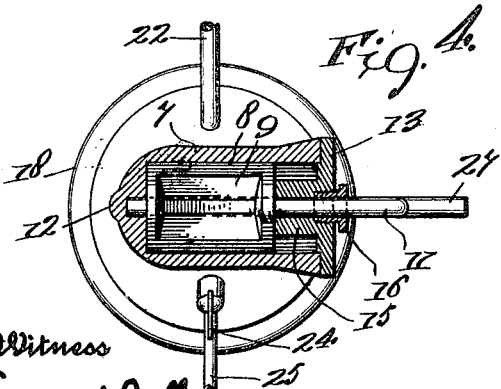
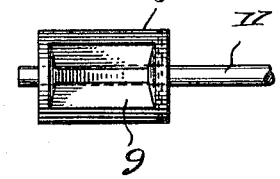
Inventor
J. B. Wright.
by Wilkinson & Giusta
Attorneys.
Witness
Edwin J. Beller.

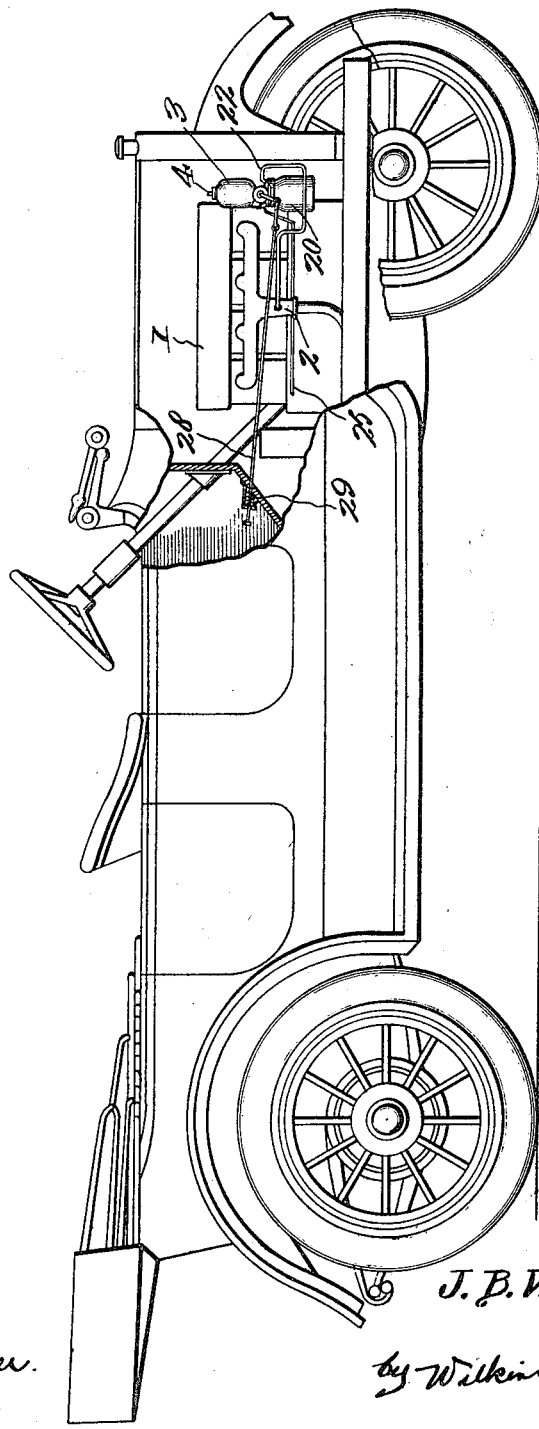

UNITED STATES PATENT OFFICE.

JAMES B. WRIGHT, OF NASHVILLE, TENNESSEE, ASSIGNOR, BY MESNE ASSIGNMENTS, OF TWO-THIRDS TO JAMES K. BURTON, OF NASHVILLE, TENNESSEE.

STARTING SYSTEM.

1,323,945.      Specification of Letters Patent.      Patented Dec. 2, 1919.

Application filed April 29, 1918. Serial No. 231,429.

*To all whom it may concern:*

Be it known that I, JAMES B. WRIGHT, a citizen of the United States, residing at Nashville, in the county of Davidson and State of Tennessee, have invented certain new and useful Improvements in Starting Systems; and I do hereby declare the following to be a full, clear, and exact description of the invention, such as will enable others skilled in the art to which it appertains to make and use the same.

The present invention relates to improvements in starting systems for internal combustion engines, and relates more particularly to an improvement in such systems as are intended to deliver to the engine a combustible gas for the purpose of starting the engine in cold weather when the gasolene resists ready evaporization.

It is an object of the present invention to provide an improved apparatus for generating such combustible gas and which will be apapted more particularly for use in connection with the motors of automobiles, and for convenience I provide means whereby the gas generator may be actuated from the driver's seat.

Another object of the present invention resides in so constructing the gas generator as to provide for the formation of the combustible gas in separate successive and controlled charges, each charge being in itself sufficient to start the motor.

In the accompanying drawings forming a part of this application, and in which similar reference symbols indicate corresponding parts in the several views:

Figure 1 illustrates a side elevational view of an automobile with the forward part broken away to show my improved apparatus and one manner of attaching it to the vehicle.

Fig. 2 is a central vertical sectional view through the gas generator.

Fig. 3 is a vertical sectional view taken on the line 3—3 in Fig. 2.

Fig. 4 is a horizontal sectional view taken on the line 4—4 in Fig. 2; and

Fig. 5 is a plan view of the valve.

Referring more particularly to the drawings, in Fig. 1 is shown a vehicle intended to be driven by the motor 1, which is supplied with a carbureted mixture prepared by the well known fuel system and delivered thereby to the manifold 2.

In cold weather great difficulty is experienced in starting automobile and other internal combustion motors using gasolene as fuel. Once the motor is started, however, and becomes heated, the vaporization of the gasolene will take place in the usual manner. In order to get the motor started I provide an apparatus for generating a combustible gas such as acetylene, which is supplied to the manifold 2 of the engine independently of the carbureter system, and which being ignited in the cylinders acts to drive the pistons down therein.

A form of my apparatus is shown in the accompanying drawings, which includes a generator composed of an upper carbid receiving chamber 3, preferably of an oval form. A threaded plug 4 screws into a filling neck 5 having complementary threads, and which porvides for the introduction of the carbid into the chamber 3. The lower part of the chamber 3 is constricted, as indicated at 6, for the purpose of concentrating the contents above a neck 7, which is preferably formed in the same piece with the chamber 3 and extends centrally below same.

A valve 8 having preferably two diametrically disposed carbid receiving pockets 9 and 10 therein, is made of a cylindrical shape to snugly and rotatably fit a correspondingly shaped socket in the neck 7; said valve 8 having its pockets 9 and 10 adapted to be successively brought immediately beneath the bottom constricted opening of the upper chamber 3; and when in such position the pockets receive a predetermined quantity of carbid in accordance with the size of the pockets provided.

The cylindrical valve 8 is fitted fast on a shaft 11 having a bearing in one wall of the neck 7 at which is provided the exterior boss 12; the other end of said shaft 11 passing through a central opening in a plate 13 which is removably held to adjacent parts, as for instance by the screws 14, and is formed with a central and inwardly extending bearing 15 which forms an elongated support for said shaft 11, which projects outwardly beyond the plate 13 as shown in Fig. 2.

The exterior face of the plate 13 is centrally recessed about the shaft 11 to provide a stuffing box into which the stuffing gland 16 is threaded.

Below the neck 7 which carries the valve 8, is provided an expanded cap piece 17 having a shoulder 18 adapted to rest upon the upper edge 19 of a water receptacle 20. The interior of the mouth of this water receptacle 20 is threaded to receive the threaded cylindrical flange 21 which extends vertically downward from the cap 17. When the threaded flange 21 is screwed home in the water receptacle 20 the shoulder 18 fits tightly against the flanged upper end 19 and forms a tight joint to prevent the escape of the generated gas. The cap 17 is also formed in one piece with the neck 7 and carbid receptacle 3, all of these parts being cast preferably from a suitable metal, for which purpose I have found aluminum excellently adapted. Water is placed in the receptacle 20 as indicated in Figs. 2 and 3.

A gas outlet is indicated at 22 and for convenience is mounted in the cap 17. As shown in Fig. 1, this pipe or gas outlet 22 is connected to the manifold 2 of the motor 1 and conveys acetylene gas generated in the water receptacle 20 to the several cylinders of the gas engine.

There is also preferably let in through the cap 17 a pipe 23, bent as indicated in Fig. 3, and having its lower end open and disposed either above or below the surface of the water in the receptacle 20. A suitable valve 24 controls the admission to the pipe 23 of air which enters by a connection 25.

The valve or screw 24 is kept normally closed so as to shut off the entrance of air through the pipe 25 to the water receptacle 20, but when it is desired to clean the engine cylinders and to wash out the carbon therefrom, the receptacle 20 is first removed, thoroughly cleaned, and supplied with fresh water, after which it is replaced and the carbid valve is kept closed in the manner shown in Fig. 3, to prevent the delivery of any carbid to the water chamber. The engine is put in operation and is caused to run until the same becomes hot, whereupon the screw or valve 24 is opened, allowing air to be sucked in through the pipes 25 and 23. This incoming air will be discharged directly into the body of fresh water in the receptacle 20, and will pick up such water and create a vapor which will be thrown through the pipe 22 into the manifold and into the cylinders of the engine. This vapor will soften and dissolve the carbon and cause the same to pass off through the exhaust valves.

The valve 8 is operated by means of the shaft 11 which is advantageously bent to form a crank arm 26 having a right angularly bent end or crank pin 27 to which is connected an operating push rod 28 passing through the foot board of the vehicle, as indicated in Fig. 1, and adapted to be returned to an initial position by spring 29. A button or foot pedal on the rod 28 is adapted to be engaged by the thumb or the foot of the driver to thrust the rod in a forward direction in opposition to the spring 29, so that the crank arm 26 may be swung to cause a rotation or partial rotation of the valve 8 necessary to deposit a previously received charge of carbid from either of the pockets 9 or 10 into the water receptacle 20.

From the locations of the two pockets 9 and 10 it will be understood that but a half revolution need be imparted to the valve 8 in order to discharge a quantity of the carbid into the water beneath. Of course other chemicals besides carbid may be employed wherever such chemical will be useful in an apparatus of this character, and will supply the necessary combustible gas required to start a gas motor.

Each of the pockets 9 and 10 will preferably be of a size to hold a predetermined quantity of carbid so as to generate, when deposited in the water receptacle 20, a charge of acetylene sufficient in volume to start the motor 1, and to feed such motor until the same acquires enough heat to cause the proper vaporizing of the gasolene. The water in the receptacle 20 is also preferably admixed with a suitable proportion of alcohol, or other anti-freezing solution.

The improved generator may be located at any convenient position on the automobile, and is with advantage placed beneath the hood, as shown in Fig. 1, at the forward part of the engine, where it is held in place by any appropriate fastening means. Access may readily be had at any time either to the water chamber 20 or to the valve 8 and the filling neck by the simple operation of unscrewing the cap 17 from the threaded neck of the receptacle 20. The valve 8 and shaft 11 may be readily removed by withdrawing the screws 14, which will allow the plate 13 and associated parts being drawn out axially from the neck 7.

It is believed that the operation of the invention will be clear from the foregoing description. By having the valve 8 furnish the carbid in limited quantities, waste of carbid is prevented, and yet ample gas assured for each operation.

It is obvious that those skilled in the art may vary the details of construction and arrangements of parts without departing from the spirit of my invention, and therefore I do not wish to be limited to such features except as may be required by the claims.

I claim:

1. In combination with an internal combustion engine, of a generator including a carbid container, a water receptacle beneath said container, means between said container and receptacle for controlling the delivery of carbid to the receptacle, a connection between said receptacle and the intake of the engine for conveying the acetylene gas generated to said engine, means for delivering a vaporizing gas to said receptacle whereby to pick up the water and form a vapor therewith which is drawn through said connection to the engine when the cylinders are to be cleansed of carbon, and valve means for controlling the admission of said vaporizing gas, substantially as described.

2. In combination with an internal combustion engine having an intake manifold, of a generator associated with said engine and having a carbid container, a water receptacle beneath said container, a valve between said container and receptacle having pockets for delivering the carbid to the receptacle in measured quantities, means whereby said valve may be operated, a connection for conveying the generated acetylene gas from said receptacle to the intake manifold of the engine, a pipe in said receptacle for conveying a vaporizing gas thereto, and a valve in said pipe for controlling the admission of the vaporizing gas, substantially as described.

3. In combination with an internal combustion engine having an intake manifold, of a generator including a carbid container, a water receptacle beneath said carbid container, a valve between said container and receptacle adapted to normally cut off the delivery of carbid and having a pocket for delivering the carbid in predetermined quantities to said water receptacle, a connection for conveying the generated acetylene gas from the upper portion of said water receptacle to the intake manifold of the engine, a pipe entering through said water receptacle and extending downwardly therein for introducing gas into contact with the water in said receptacle, and a valve for controlling the admission of the gas through said pipe, substantially as described.

In testimony whereof I affix my signature.

JAMES B. WRIGHT.